United States Patent

Jackson et al.

[11] Patent Number: 6,022,286
[45] Date of Patent: Feb. 8, 2000

[54] PULLEY WITH AN INTEGRAL SECURING MECHANISM

[75] Inventors: Kurt A. Jackson, El Paso; Dale A. Dalton, Metamora; Lee R. Loyd, Peoria, all of Ill.

[73] Assignee: Caterpillar Inc., Peoria, Ill.

[21] Appl. No.: 08/991,784

[22] Filed: Dec. 12, 1997

[51] Int. Cl.[7] ............................. F16H 55/49; F16H 55/50
[52] U.S. Cl. ........................................... 474/170; 474/903
[58] Field of Search ........................ 474/95, 96, 148, 474/150, 168, 170, 198, 903

[56] References Cited

U.S. PATENT DOCUMENTS

| | | | |
|---|---|---|---|
| 2,553,791 | 5/1951 | Smith | 74/230.3 |
| 3,245,273 | 4/1966 | Loper et al. | 74/230.4 |
| 3,618,411 | 11/1971 | Rottweiler | 74/230.11 |
| 3,696,685 | 10/1972 | Lampredi | 474/903 |
| 4,078,445 | 3/1978 | Kiser, Jr. | 74/243 R |
| 4,182,193 | 1/1980 | Schultz, Jr. | 74/230.8 |
| 4,416,650 | 11/1983 | Wilkins | 474/903 |
| 4,874,973 | 10/1989 | Matsushita et al. | 474/168 |
| 5,163,883 | 11/1992 | Bradfield | 474/903 |
| 5,195,241 | 3/1993 | Bradfield | 29/892 |
| 5,275,577 | 1/1994 | Hildebrandt et al. | 474/903 |
| 5,288,277 | 2/1994 | Kummerfeld | 474/198 |
| 5,304,101 | 4/1994 | Baer | 474/95 |
| 5,393,271 | 2/1995 | Sands | 474/96 |
| 5,720,685 | 2/1998 | Malone | 474/903 |
| 5,765,961 | 6/1998 | Phillips | 474/903 |

*Primary Examiner*—Tamara L. Graysay
*Assistant Examiner*—Matthew A. Kaness
*Attorney, Agent, or Firm*—Al J. Hiickman; Larry G. Cain

[57] ABSTRACT

A pulley suitable for use in a V-type belt drive power train, the pulley including an integral securing mechanism in the central bore thereof for engaging a corresponding securing mechanism on the shaft of the device to be driven by the pulley, the integral securing mechanism preferably being corresponding screw threads, with a method of manufacturing the pulley from cylindrical bar stock as a unit including the generation of the V-belt grooves, the central bore, forming the integral securing mechanism in the central bore, and cutting off the pulley to provide a one-piece pulley of substantially simplified design.

16 Claims, 1 Drawing Sheet

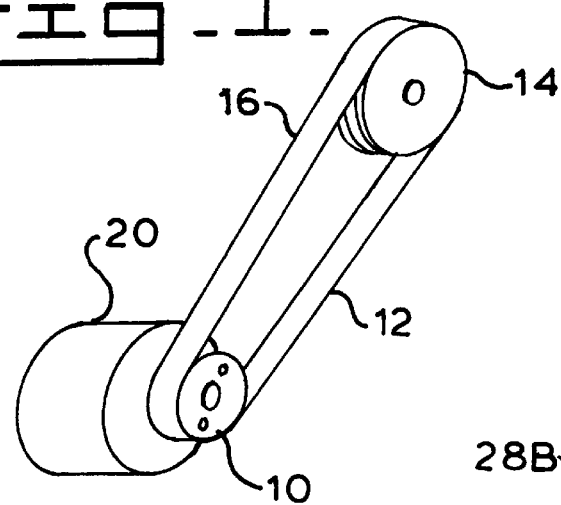
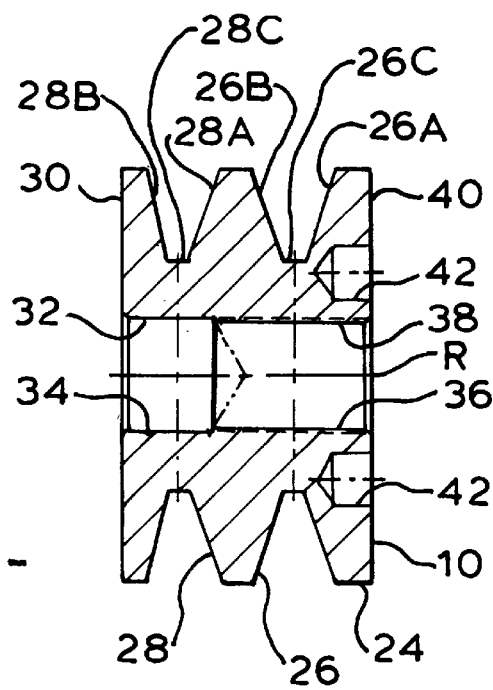
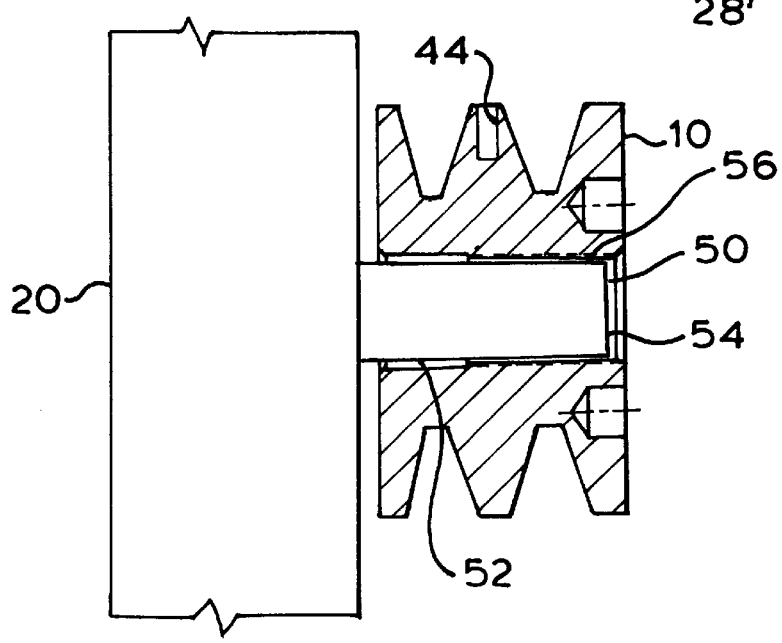

PULLEY WITH AN INTEGRAL SECURING MECHANISM

TECHNICAL FIELD

This invention generally pertains to pulleys suitable for mechanical power transmission, and more particularly to pulleys for operating engine and other vehicular equipment accessories.

BACKGROUND ART

In mechanical power transmission systems where an elastomeric belt is employed to engage pulleys on parallel shafts for transmitting power between the shafts, each pulley must be secured to a shaft to ensure proper power transmission. It is common to secure each pulley to its respective shaft by means of a separate nut. The securing nut assures the proper positional placement of the pulley on the shaft. Proper placement of the pulley is required in order to ensure that the pulleys do not become misaligned, since misalignment of the pulleys can cause undesirable operating noise or even disengagement of the belt from one or both of the pulleys.

In such applications, it is also necessary to employ a separate mechanical linkage to assure proper transmission of power from the pulley to the driven shaft. One such linkage includes a rectangular key engaging both the pulley and the shaft in juxtaposed slots. Another common means of assuring proper mechanical power transmission between the pulley and the shaft is the use of corresponding configurations of the pulley and the shaft, such as corresponding flat surfaces in the form of a planer chord on the shaft surface and in the bore of the pulley. A third means includes the use of corresponding splines generated in the pulley bore and on the shaft. Any of these typically used means requires substantial machining of both the pulley and the cooperating shaft. Furthermore, a number of steps of assembly are often required, in many cases involving the use of spacers on the shaft to assure the proper placement of the pulley, the insertion of a key in some cases, and the installation of the nut with spacing washers or lock washers where desired to secure the pulley to the shaft.

One attempt to address these problems in the prior art has been set forth in U.S. Pat. No. 5,195,241. This patent discloses a method of manufacturing a pulley with an integral fastener and spacer. According to the '241 reference, the pulley is generated in a multiple step manufacturing process which includes drawing a pulley blank with a hub and annular extending disc, splitting the end of the disc and roll forming the belt engaging surface at the outer end of the annular disc. A center bore in the pulley is provided with a threaded portion for engaging threads on the corresponding shaft. One limitation imposed on the design of a pulley according to the '241 reference is the fact that the material used in forming the pulley must be susceptible to roll forming to generate the finished pulley. As a consequence, the material forming the belt engaging wall must be fairly thin and therefore primarily useful in low power or light duty applications.

An additional consideration in typical automotive and vehicular applications is the space constraints imposed upon the drive belt power transmission train by the operating environment and enclosure. An exemplary application of such a drive belt power transmission train is the operation an alternator by a V-belt drive train from the crank shaft pulley of an engine. The space available for the drive train may limit the typical drive train to providing a single V belt to operate the alternator. However, where a high power output demand is to be made on an alternator, it is generally desirable to provide multiple V-belts in the alternator's power transmission train to enhance both the reliability and the durability of the power transmission train by reducing the opportunity for belt slippage and belt failure.

Furthermore, it is well known that the ratio of the diameters of the pulleys in a belt drive power transmission train directly influences the speed of the output shaft with respect to the speed of the input shaft. Since in many automotive and vehicular applications, space constraints and manufacturing considerations impose limitations upon the maximum acceptable diameter of the pulleys in a given power transmission train, it is often preferable to minimize the diameters of the pulleys. Reducing the diameters of both the input and output pulleys correspondingly reduces the size and weight of the belt drive power train as well.

In addition, many components found in typical automotive and vehicular applications have been standardized to optimize their performance within specified ranges of performance. This standardization also dictates the requisite size of the pulleys to be employed in a belt drive power train. For example, where the prime mover is to be operated at a below standard revolutions per minute (RPM), a standard alternator may be operating at an RPM below that required for proper operation. Therefore, it may be desirable to reduce the diameter of the alternator drive pulley in order to increase the revolutions per minute (RPM) of the alternator to operate the alternator within its appropriate specified RPM range and ensure proper performance thereof. However, it is difficult to manufacture a pulley according to conventional and typical means which can achieve the desired minimal diameter while remaining suitably manufacturable, and which can be conveniently assembled with the driven device.

Therefore, it is an object of the present invention to provide a pulley with an integral fastening means.

It is a further object of the present invention to provide such a pulley as can be manufactured with minimal manufacturing steps.

It is another object of the present invention to provide such a pulley as can be employed in heavy duty applications requiring a relatively high power transfer.

It is a further object of the present invention to provide such a pulley as can be manufactured to a desired minimum diameter.

It is yet a further object of the present invention to provide such a pulley as may be simply installed to a corresponding shaft.

It is yet a further object of the present invention to provide such a pulley as can be readily and easily manufactured to operate with a typical elastomeric belt of the single V, multiple V, or poly-V type belt.

It is yet another object of the present invention to provide such a pulley as may be adapted to operate with multiple elastomeric belts.

It is yet another object of the present invention to provide such a pulley as will permit a compact multiple V-type belt power transmission drive.

These and other objects of the present invention will become apparent in the specification and claims that follow.

SUMMARY OF THE INVENTION

The subject invention is a pulley with a central bore including a threaded portion comprising an integral fastening means suitable for use in a power transmission apparatus to engage and drive a corresponding driven device.

BRIEF DESCRIPTION OF THE DRAWINGS

FIG. 1 shows in perspective view a belt-type power transmission apparatus including a pulley according to the subject invention.

FIG. 2 shows a cross-sectional view of a pulley according to the subject invention as shown in FIG. 1.

FIG. 3 shows a cross-sectional view of the pulley according to the subject invention in conjunction with an exemplary output shaft and driven machine.

DESCRIPTION OF THE PREFERRED EMBODIMENT

A pulley generally useful in a belt-type power transmission or drive apparatus 12 according to the subject invention is shown in perspective view in FIG. 1 and referred to with reference number 10. As shown, the pulley 10 is adapted for use in a drive apparatus 12 employing one multiple V-type belt or two single V-type belts. Those skilled in the relevant art will understand that the pulley 10 may be employed in other belt-type drive apparatus 12 where the pulley 10 is conformed to suitably engage the selected belt.

A representative drive apparatus 12 is disclosed in FIG. 1. The drive apparatus 12 includes the pulley 10 and a second, relatively larger pulley 14 operating on an axis which is spaced apart from and parallel to the axis of rotation of pulley 10. A multiple V-type belt 16 connects between the first pulley 10 and the second pulley 14 for transmitting power between the two pulleys 10 and 14. The first pulley 10 is secured to a device 20 to be operated by the drive apparatus 12, such as an exemplary alternator 20. A prime mover (not shown), such as an internal combustion engine, is connected to and drives the second pulley 14, transmitting power through the belt 16 to the pulley 10 to drive the alternator 20.

Turning then to FIG. 2, the pulley 10 according to the subject invention is shown in crosssectional view and can be seen in greater detail. The pulley 10 has a pulley external surface 24 defining an external diameter of the pulley 10. Two annular, spaced apart, V-shaped grooves 26 and 28 are formed in the pulley external surface 24. The first and second grooves 26 and 28 are preferably identical. The first groove 26 includes two groove lands 26A and 26B, and a groove base 26C, and the second groove 28 similarly includes two groove lands 28A and 28B, and a groove base 28C. The groove lands A and B of the first and second grooves 26 and 28 are angled inwardly toward the base C such that each groove 26 and 28 defines a V-shaped groove for accepting the corresponding portions of the belt 16.

A central bore 32 is provided in the rear face 30 of the pulley 10 on the axis of rotation R thereof. The central bore 32 includes a first, relatively larger diameter bore portion 34 and a second, relatively smaller diameter bore portion 36. The second, relatively smaller diameter bore portion 36 is preferably longer in length along the axis R than the first bore portion 34, and is provided with an integral securing mechanism or means 38 comprised preferably of screw threads of a selected pitch and diameter.

As those skilled in the relevant art will recognize, proper placement of the pulley 10 on the device drive shaft 50 is necessary to ensure proper alignment of the elastomeric belt 16 when the driven device 20 is installed into the drive apparatus 12. In order to ensure this alignment, various means may be employed. The preferred method, as described herein, is to selectively control the relative depth of the first bore portion 34 and the first shaft portion 52. An alternative means would include the provision of spacer elements, such as washers or collars of various, selected thicknesses and diameters, which may be placed on the drive shaft 50 so as to engage either the pulley back face 30 or the first bore portion 34. This and other alternative methods of controlling the pulley 10 placement are not shown or further described herein, as it is believed that the design and employment of spacer elements and other such means are well known to those skilled in the relevant art.

Preferably, the second portion 36 is disposed toward the pulley front face 40. Also, the pulley front face 40 also includes at least two cylindrical recesses 42. The cylindrical recesses 42 are formed on axes parallel to the pulley axis of rotation R, and are spaced apart from the axis of rotation R at generally opposing positions in the pulley front face 40, those positions preferably being opposite each other and equidistantly spaced apart. These cylindrical recesses 42 could be engaged by a tool such as a spanner (not shown) for turning the pulley 10 to secure the pulley 10 to the drive shaft 50.

The pulley 10 is shown with a driven device such as alternator 20 in FIG. 3. A device input or drive shaft 50 is provided on the alternator 20 for engaging the pulley 10. To correspond with the pulley 10, the drive shaft 50 includes a first shaft portion 52 and a second shaft portion 54. The second shaft portion 54 of the drive shaft 50 is provided with a shaft securing mechanism or means 56 threads of a pitch in diameter corresponding to the threads selected for the second bore portion 36 of the pulley 10. This permits the pulley 10 to removably engage the drive shaft 50 by mating the threads in the second bore portion 36 with the corresponding threads in the second shaft portion 54. Also shown in FIG. 3 is an alternative spanner bore 44 which may be provided in the pulley exterior surface 24, with the spanner bore 44 having an axis perpendicular to the axis R of the central bore 32 so that a spanner engaging the spanner bore 44 could be employed to torque the pulley 10 into position.

The threads of the second shaft portion 54 and second bore portion 36 are selected to correspond to the direction of rotation in which the driven device 20 will be operated. This ensures that the pulley 10 remains secured to the driven shaft 50 during operation of the power transmission 12. Also, the threads of the second shaft portion 54 and the second bore portion 36 are of a suitable pitch in diameter to ensure power transmission between pulley 10 and driven device 20 without causing a failure of the material of the pulley 10 or driven shaft 50.

The drive apparatus 12 is assembled by placing the device drive shaft 50 into the central bore of the pulley 10 and engaging the corresponding threads of the second bore portion 36 and the second shaft portion 54 until the pulley 10 is secured to the driven device 20 as shown in FIG. 3. The belt 16 is then placed into engagement with the first and second grooves of 26 and 28 of the pulley 10 and the second, drive pulley 14, with suitable tension being applied to ensure proper power transmission therebetween. Upon operation of the drive pulley 14, the belt 16 turns the pulley 10. The rotation of the pulley 10 is transferred through the threads of the second bore portion 36 and the second shaft portion 54 to operate the driven device 20.

Preferably, the pulley 10 is manufactured from a metal, such as steel, cast iron, or aluminum, although a composite material may be employed in suitable applications. An exemplary manufacturing operation would be accomplished relatively simply, by employing a multiple operation turret lathe. A number of pulleys 10 can be generated from a single length of cylindrical bar stock disposed in the chuck of the lathe. A cutting tool is used to turn the grooves 26 and 28. The central bore 32 is then bored, with the first bore portion 52 and the second bore portion 36. A thread cutting tool is employed to generate the desired screw thread to form the integral securing means 38 in the second bore portion 36. An appropriate cutting tool can then be used to cut the finished pulley 10 from the bar stock.

Alternatively, the pulley 10 may be manufactured from a die cast blank and given a machined finish. According to this method of manufacture, the pulley 10 would be cast from a suitable material in a blank of the generally desired conformation. The central bore 32 is then bored axially in the die cast blank to its finished dimensions including the first bore portion 52 and the second bore portion 36. A thread cutting tool is employed to generate the desired screw thread to form the integral securing means 38 in the second bore portion 36.

Thus it can be seen that the pulley 10 provides several advantages over the prior art. Due to the simplicity of the manufacture of the pulley 10, a relatively small number of steps are required and the manufacture is relatively straightforward. Furthermore, the use of threads as the integral securing means 38 which engage the shaft securing means 56 in a direction corresponding to the direction of rotation of the pulley 10, ensures that the pulley 10 remains securely affixed to the shaft 50. This in turn assures the power transfer between the pulley 10 and the driven device 20 and improves the reliability of the drive apparatus 12. Furthermore, because the pulley 10, in suitable embodiments, can accommodate elastomeric belts 16 having more than one V portion through the use of multiple grooves such as first and second groove 26 and 28, the pulley 10 is suitable for relatively heavy duty applications requiring a relatively high rate of power transfer. Another advantage of the pulley 10 according to the present invention is the ability to attain a desired minimum diameter and so be useful in relatively compact drive apparatus 12, while being adaptable in various embodiments to the use of elastomeric belts of various types such as single V, multiple V or poly-V belts, therefore providing and additional advantage in permitting the use of the subject invention for improved performance of the driven device 20 without requiring substantial modification of other components typically found in such drive apparatus 12.

Modifications to the preferred embodiment of the subject invention will be apparent to those skilled in the art within the scope of the claims that follow:

What is claimed is:

1. A pulley for use in a power transmission apparatus having a driven device defining a direction of rotation, said pulley comprised of:
   a cylindrical pulley external surface defining at least a first groove, said pulley external surface of said pulley defined about an axis of rotation (R);
   a central bore defined on said axis of rotation (R) of said pulley, said central bore further including an integral securing mechanism, said integral securing mechanism being a screw thread selected to correspond to said direction of rotation of said driven device.

2. The pulley as set forth in claim 1 wherein said central bore further includes a first bore portion and a second bore portion.

3. The pulley as set forth in claim 2 wherein said integral securing mechanism is defined in said second bore portion.

4. The pulley as set forth in claim 3 wherein said pulley external surface further includes a second groove spaced apart from and parallel to said first groove.

5. The pulley as set forth in claim 4 wherein said first groove further includes two spaced apart pulley groove lands, and a pulley groove base, said pulley groove lands adapted for accepting a V-type belt.

6. The pulley as set forth in claim 5 wherein said second groove further includes two spaced apart pulley groove lands, and a pulley groove base, said pulley groove lands adapted for accepting a V-Type belt.

7. The pulley as set forth in claim 4 wherein said pulley further includes a front face, said front face further including at least two recesses spaced apart from said central bore.

8. The power transmission apparatus as set forth in claim 4 wherein said pulley external surface further includes a perpendicular spanner bore for engaging a spanner.

9. A power transmission apparatus comprised of:
   a driven device defining a direction of rotation, said driven device including a device drive shaft with an integral securing portion;
   a first pulley, said first pulley having a pulley external surface with a first groove defined therein, said pulley further including a central bore defined around an axis of rotation (R), said central bore further including an integral securing mechanism being a screw thread corresponding to said direction of rotation of said driven device engaging said integral securing portion of said device drive shaft;
   a belt; and
   a second pulley adapted to engage said belt for driving said belt and said first pulley.

10. The power transmission apparatus as set forth in claim 9 wherein said central bore of said pulley further includes a first bore portion and a second bore portion.

11. The power transmission apparatus as set forth in claim 10 wherein said integral securing mechanism is defined in said second bore portion.

12. The power transmission apparatus as set forth in claim 11 wherein said pulley external surface further includes a first groove and a second groove spaced apart from and parallel to said first groove.

13. The power transmission apparatus as set forth in claim 12 wherein said first groove of said pulley further includes two spaced apart pulley groove lands, and a pulley groove base, said pulley groove lands adapted for accepting an elastomeric belt.

14. The power transmission apparatus as set forth in claim 13 wherein said second groove of said pulley further includes two spaced apart pulley groove lands, and a pulley groove base, each said pulley groove land adapted for accepting an elastomeric belt.

15. The power transmission apparatus as set forth in claim 12 wherein said pulley further includes a front face, said front face further including at least two recesses spaced apart from said central bore.

16. The power transmission apparatus as set forth in claim 12 wherein said pulley external surface further includes a perpendicular spanner bore for engaging a spanner.

* * * * *

UNITED STATES PATENT AND TRADEMARK OFFICE
CERTIFICATE OF CORRECTION

PATENT NO. : 6,022,286
DATED : February 8, 2000
INVENTOR(S) : Kurt A. Jackson, et. al.

It is certified that error appears in the above-identified patent and that said Letters Patent is hereby corrected as shown below:

Column 6, line 13, delete "V-Type" and insert --V-type--

Signed and Sealed this

First Day of May, 2001

Attest:

NICHOLAS P. GODICI

Attesting Officer     *Acting Director of the United States Patent and Trademark Office*